(12) United States Patent
McCormack

(10) Patent No.: US 10,229,280 B2
(45) Date of Patent: Mar. 12, 2019

(54) SYSTEM AND METHOD TO PROTECT A RESOURCE USING AN ACTIVE AVATAR

(75) Inventor: Robert John McCormack, Rivervale (AU)

(73) Assignee: International Business Machines Corporation, Armonk, NY (US)

( * ) Notice: Subject to any disclaimer, the term of this patent is extended or adjusted under 35 U.S.C. 154(b) by 1019 days.

(21) Appl. No.: 13/159,963

(22) Filed: Jun. 14, 2011

(65) Prior Publication Data
US 2012/0324591 A1    Dec. 20, 2012

(51) Int. Cl.
*G06F 21/62* (2013.01)
*H04L 29/06* (2006.01)

(52) U.S. Cl.
CPC .......... *G06F 21/6218* (2013.01); *G06F 21/62* (2013.01); *H04L 63/10* (2013.01); *H04L 63/102* (2013.01); *H04L 63/104* (2013.01); *H04L 63/105* (2013.01); *H04L 63/20* (2013.01)

(58) Field of Classification Search
CPC ...... A63F 13/00; G06F 21/6218; G06F 21/62; H04L 63/105; H04L 63/102; H04L 63/104; H04L 63/20; H04L 63/10; G06Q 30/00
See application file for complete search history.

(56) References Cited

U.S. PATENT DOCUMENTS

| 6,233,576 B1 | 5/2001 | Lewis |
| 7,027,055 B2 * | 4/2006 | Anderson ............. G06F 11/328 345/473 |
| 7,249,369 B2 | 7/2007 | Knouse et al. |

(Continued)

FOREIGN PATENT DOCUMENTS

WO    WO0195202    12/2001

OTHER PUBLICATIONS

IBM OS/390, Security Server (RACF) Introduction.

*Primary Examiner* — Theodore C Parsons
(74) *Attorney, Agent, or Firm* — Robert J. Shatto; Jeffrey S. LaBaw; David H. Judson

(57) ABSTRACT

A data source owner in a computing system protects that source via a "virtual" or surrogate entity or "avatar." The entity is an object whose presence in the system is human-like, and it is given the specific task of protecting the data source for the owner. The avatar is associated with (or defined by) a non-human userid that has the same accesses and privileges of all (or defined) users, user groups and other resources that have access to the data source to be protected. During an initial setup, one or more actions to be performed by the non-human userid upon an occurrence of an actionable event with respect to the data source are specified, and a "baseline" associated with the data source is determined. Following setup, a monitor process is executed under the non-human userid, and this process records one or more accesses to the data source. Periodically, or upon a given occurrence, the monitor process spawns one or more ancillary processes to determine whether an actionable event has been triggered. If the avatar's monitoring efforts indicate an actionable event (such as an access violation), an action as defined in an action matrix is taken. The action typically includes reporting to the data source owner and, optionally, a security administrator, and restricting access to the data source.

23 Claims, 4 Drawing Sheets

(56) References Cited

U.S. PATENT DOCUMENTS

| | | |
|---|---|---|
| 7,426,512 B1* | 9/2008 | Ben-Natan ............... G06F 21/55 |
| 7,594,266 B2 | 9/2009 | Mattsson |
| 7,673,147 B2 | 3/2010 | Moghe et al. |
| 7,822,980 B2 | 10/2010 | Botz et al. |
| 2002/0013837 A1* | 1/2002 | Battat ................... G06F 3/0481 |
| | | 709/223 |
| 2003/0101355 A1 | 5/2003 | Mattsson |
| 2004/0205772 A1* | 10/2004 | Uszok et al. ................. 719/317 |
| 2005/0182969 A1* | 8/2005 | Ginter ..................... G06F 21/55 |
| | | 726/5 |
| 2006/0294596 A1* | 12/2006 | Govindarajan et al. ........ 726/27 |
| 2007/0143851 A1* | 6/2007 | Nicodemus ............. G06F 21/55 |
| | | 726/25 |
| 2008/0056531 A1* | 3/2008 | Zhao ....................... G06F 21/10 |
| | | 382/100 |
| 2008/0250315 A1* | 10/2008 | Eronen et al. ................ 715/706 |
| 2009/0007227 A1* | 1/2009 | Burgess ................ G06F 21/316 |
| | | 726/1 |
| 2009/0100507 A1 | 4/2009 | Johnson |
| 2009/0254747 A1* | 10/2009 | Bussani et al. .............. 713/168 |
| 2010/0138755 A1* | 6/2010 | Kulkarni et al. ............. 715/757 |
| 2010/0146395 A1* | 6/2010 | Reyes et al. .................. 715/734 |
| 2010/0332998 A1* | 12/2010 | Sun .................... G06F 3/04815 |
| | | 715/757 |
| 2012/0255011 A1* | 10/2012 | Sallam .................. G06F 21/554 |
| | | 726/24 |

* cited by examiner

*FIG. 9*

ACTION MATRIX 900

| ENABLED (Y/N) | CASE NUMBER | OCCURRENCE | ACTION | REPORT TO OWNER | REPORT TO OWNER AND SECURITY ADMINISTRATOR |
|---|---|---|---|---|---|
| | 0001 | FULL COPY OF DATA SOURCE FOUND BUT NO COPIES OF THIS DATA SOURCE IS PERMITTED | ISSUE A REPORT | Y | Y |
| | 0002 | FULL COPY OF DATA SOURCE FOUND BUT NO COPIES OF THIS DATA SOURCE IS PERMITTED | ISSUE A REPORT | Y | N |
| | 0003 | PARTIAL COPY OF DATA SOURCE FOUND BUT NO COPIES OF THIS DATA SOURCE IS PERMITTED | ISSUE A REPORT | Y | Y |
| | 0004 | PARTIAL COPY OF DATA SOURCE FOUND BUT NO COPIES OF THIS DATA SOURCE IS PERMITTED | ISSUE A REPORT | Y | N |
| | 0005 | FULL COPY OF DATA SOURCE FOUND BUT NO COPIES OF THIS DATA SOURCE IS PERMITTED | IDENTIFY THOSE USERIDS OR GROUPS OF USERIDS WHO HAVE WRITE ACCESS TO THIS NEWLY FOUND COPY. THESE ENTITIES WILL NOW HAVE THEIR ACCESS TO THE ORIGINAL DATA SOURCE REMOVED. A REPORT ON THIS ACTION IS ISSUED. | | Y |
| | 0007 | PARTIAL COPY OF DATA SOURCE FOUND BUT NO COPIES OF THIS DATA SOURCE IS PERMITTED | IDENTIFY THOSE USERIDS OR GROUPS OF USERIDS WHO HAVE WRITE ACCESS TO THIS NEWLY FOUND PARTIAL COPY. THESE ENTITIES WILL NOW HAVE THEIR ACCESS TO THE ORIGINAL DATA SOURCE REMOVED. A REPORT ON THIS ACTION IS ISSUED. | Y | Y |
| | 0008 | PARTIAL COPY OF DATA SOURCE FOUND BUT NO COPIES OF THIS DATA SOURCE IS PERMITTED | ISSUE A REPORT | Y | N |
| | 0009 | ACCESS BY VALID USER WHO INVOKES AN INVALID PROGRAM | REMOVE ACCESS FROM THIS USER, OR IF APPLICABLE REMOVE ACCESS FOR THE GROUP THIS USER BELONGS TO | Y | Y |

904 — 906 — 908 — 910 — 912 — 902

SYSTEM AND METHOD TO PROTECT A RESOURCE USING AN ACTIVE AVATAR

BACKGROUND OF THE INVENTION

Technical Field

This disclosure relates generally to securing resources in a distributed computing environment, such as a transaction processing environment.

Background of the Related Art

Security systems associated with complex, multi-component computing environments are designed to permit selective and controlled access by active entities (such as users) to static entities (such as data sources).

A representative multi-component system of this type, wherein components work together cooperatively to form a larger system, is the IBM® HyperText Transfer Protocol (HTTP) and Web Services processing environment, which may be implemented using IBM mainframe computers, such as the IBM z196 family of computing machines. This environment typically includes IBM's WebSphere® Application Server (WAS) middleware platform software product, working in conjunction with one or more transaction processing products, such as IBM Customer Information Control System (CICS®) and/or IBM Information Management System (IMS), a message processing product, such as IBM WebSphere MQ, and a relational database, such as IBM DB2® database. An objective of a multi-component environment is to provide a high performance transaction processing computing system or environment accessible to client end-users via Internet browsers using HTTP or other Web Services. In this environment, the client end-user making the HTTP or Web Services request communicates directly with the application server. Typically, to fulfill the transaction request from the distributed client end-user, the application server invokes the services of one or more other components in the environment. One of more of these components typically execute on an operating system, such as IBM z/OS® operating system, which is often referred to as a "mainframe" operating system platform.

In such an environment, the transaction processing, messaging, and database components typically are executing within a mainframe computer that includes a framework for managing security within the environment. The framework includes a security server. In a representative z/OS implementation, the security framework is provided by z/OS Security Server, which includes the IBM Resource Access Control Facility (RACF®) as its security engine. RACF allows an administrator to set rules for controlling access to resources by defining what is protected at what level and determining who can access protected resources. In a typical mainframe operating environment (e.g., z/OS), RACF is used to identify and verify users' authority to access data and to use system facilities.

The above-described products and technologies expose interfaces that can be used by permitted entities, such as administrators, to monitor and manage resources that are being protected by the system. These approaches, however, typically vest control in a central security administrator.

It would be desirable to provide a technique by which an owner of a data source on a computing system of this type could protect that data source without requiring active involvement by a central security administrator to monitor and report on activities associated with the data source. This disclosure addresses this need.

BRIEF SUMMARY

According to this disclosure, an owner of a data source (e.g., a static protected resource) in a computing system protects that source via a "virtual" or surrogate entity or "avatar." The entity is an object whose presence in the system is human-like, and it is given the specific task of protecting the data source for the owner. In particular, the avatar is associated with (or defined by) a non-human user identifier (userid) that has the same accesses and privileges of all (or defined) users, user groups and other resources that have access to the data source to be protected. During an initial setup, one or more actions to be performed by the non-human userid upon an occurrence of an actionable event with respect to the data source are specified, and a "baseline" associated with the data source is determined. The baseline comprises data identifying permissible accesses with respect to the data source, and a list of all (or defined) users, user groups and other resources that are permitted to access the data source. Following setup, a monitor process is executed under the non-human userid, and this process records one or more accesses to the data source. Periodically, or upon a given occurrence, the monitor process spawns one or more ancillary processes to determine whether an actionable event has been triggered. These ancillary processes comprise one or more of the following: a search process (e.g., to determine whether a copy of the data source exists elsewhere in the system), an audit process (e.g., to determine whether an action or set of actions indicate a threat to the data source), and an action task process (e.g., to respond to a particular message directed to the data source). If the avatar's monitoring efforts indicate an actionable event (such as an access violation), an action as defined in an action matrix is taken. The action typically includes reporting to the data source owner and, optionally, a security administrator. The system may also respond to an actionable event to inhibit access to the resource being protected.

In an alternative embodiment, the above-described method is performed in an apparatus. The apparatus carries out the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the present invention and the advantages thereof, reference is now made to the following descriptions taken in conjunction with the accompanying drawings, in which:

FIG. 9 illustrates a representative action matrix (AM) that is used by the monitor process.

DETAILED DESCRIPTION OF AN ILLUSTRATIVE EMBODIMENT

Figure 1:
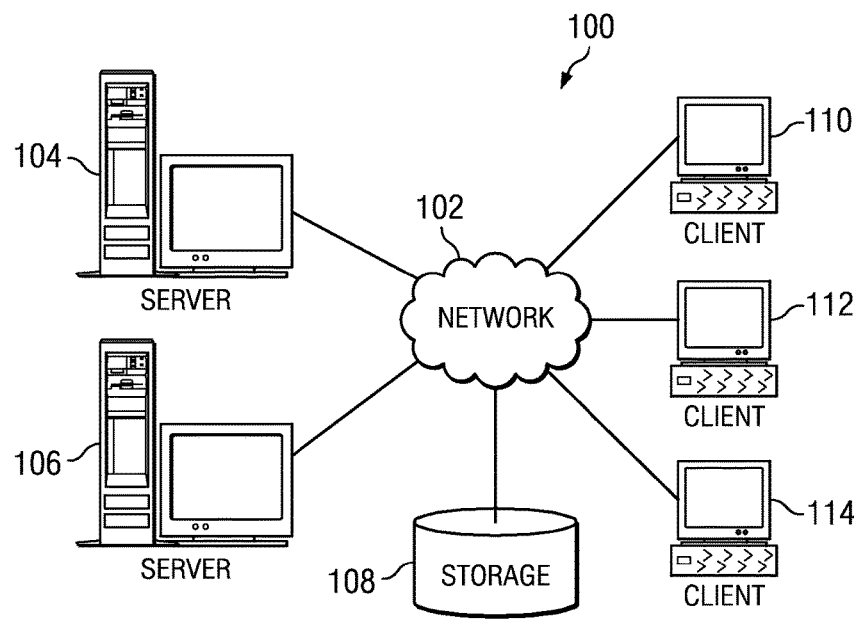
FIG. 1 depicts an exemplary block diagram of a distributed data processing environment in which exemplary aspects of the illustrative embodiments may be implemented.
Figure 2:
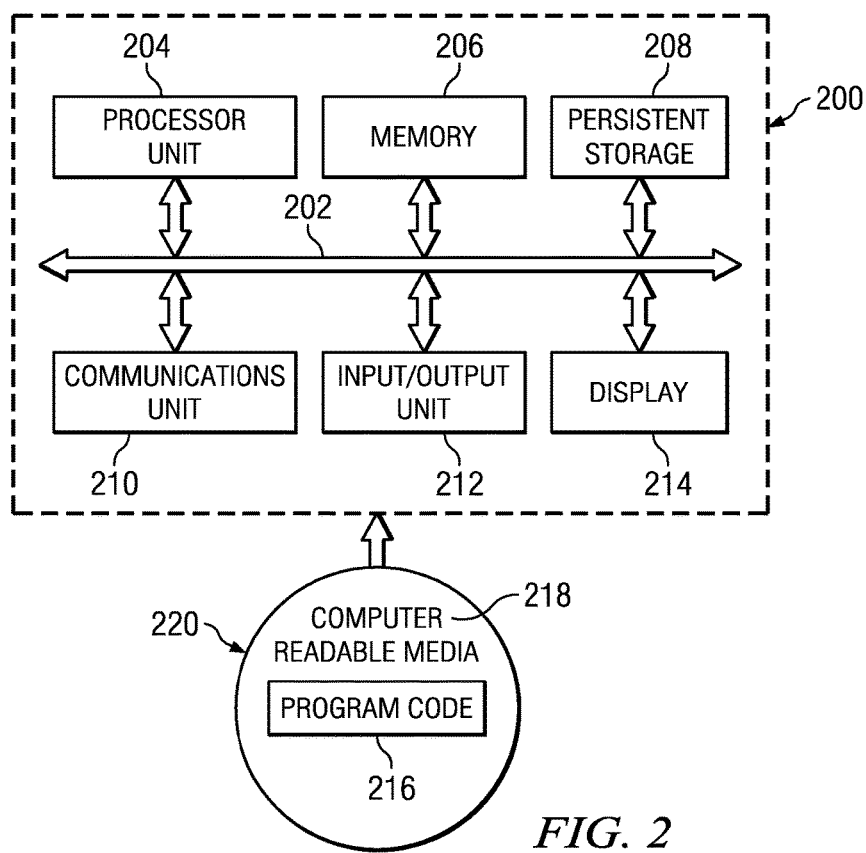
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Figure 3:
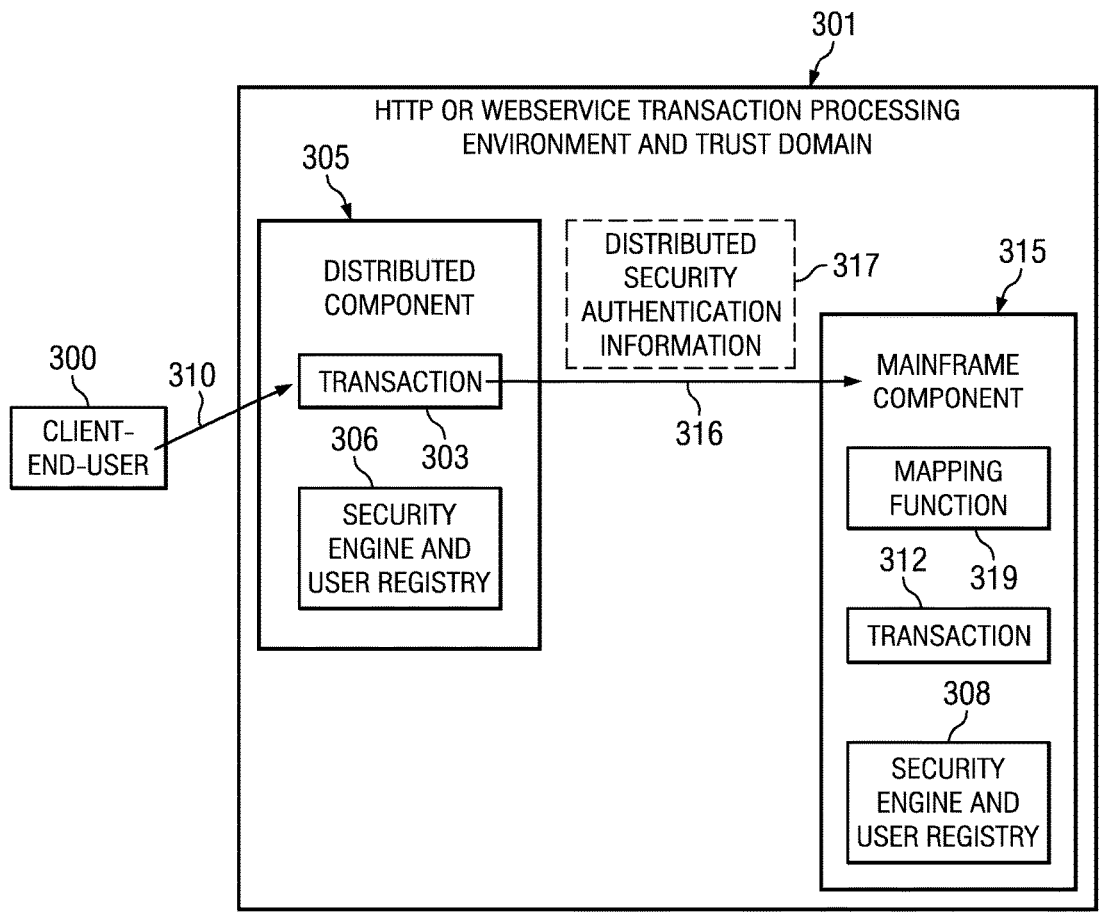
FIG. 3 depicts one implementation of a multiple component transaction processing environment including both distributed and mainframe computing components and in which the subject matter of this disclosure may be implemented.

One particular embodiment of a multi-component computing environment in which the subject matter herein may be implemented is shown in FIG. 3. This environment includes an initial authentication component 305 and a subsequent mainframe processing component 315. Each component includes its own security engine and user registry 306, 308. A user registry (also referred to herein as a local user registry or security registry) contains information on users having access to the respective component, such as user IDs and passwords. In one example, the initial authentication component may be a WebSphere Application Server (WAS), running on a Linux operating system, running within a Logical Partition (LPAR) within a z196 computer (offered commercially by IBM) and the subsequent processing component may be an implementation of Customer Information Control System (CICS), which is also offered by IBM, running within a mainframe operating system (such as IBM z/OS operating system), executing on the same or perhaps a different z196 computer.

The initial authentication server includes an identification and authentication component or service to identify and authenticate a client end-user 300 making a request 310. In one embodiment, identification and authentication is accomplished by way of the operating system, for instance, implementing an appropriate pluggable authentication module in a Linux environment. In another embodiment, the client end-user identification and authentication is accomplished by client-authenticated SSL in which the client-end-user has a digital certificate signed by a certificate authority that is trusted by the authenticating distributed component.

A trust relationship is established between the initial authentication component and the security engine of the subsequent processing component. The trust relationship is based on the secure exchange of a secret cryptographic data signature key that is used to validate distributed client-end-user identities and other information transferred within the distributed security information transaction processing message part. The actual secure exchange may be accomplished by multiple known methods.

Typically, the initial authentication component acquires a digital certificate as part of its installation processing, using for example the Simple Certificate Enrollment Protocol (SCEP), which is supported by the Public Key Infrastructure function within the IBM z/OS operating system. As part of its initialization processing, the initial authentication component 305 establishes a client authenticated SSL session with the mainframe security engine 308 of the mainframe component 315 of the transaction-processing environment. During this "initialization session," the initial authentication component will "register" itself as a user with the mainframe security engine and have its credentials, including the shared secret data signature key, recorded within the mainframe security engine (e.g., RACF) user registry of the mainframe security engine within the "key rings" that the mainframe security engine retains for selected users, thus establishing the trust relationship.

This trust relationship means that among security user identification and authentication services used by the distributed and mainframe components, a user identification and authentication performed within one component is understood and trusted by another component within the multi-component transaction processing environment. This security trust relationship is also referred to herein as a trust domain, with domain 301 being one example. Trust domain 301 is established to include initial authentication component 305, and at least one subsequent processing component 315. In operation, transaction 303 running within the distributed component 305 of the multi-component transaction processing environment 301, as part of its processing, initiates a subsequent transaction request 316 to the mainframe component of the same environment. Distributed component 305 includes distributed security authentication information 317, in the transaction request message flow to mainframe component 315.

Mainframe component 315 receives distributed security authentication information 317, along with subsequent transaction request 316, and utilizes an installation administratively defined mapping function 319 to determine what local mainframe component user identity with which to execute subsequent transaction 312. The mapping function utilized may be a simple programming coded table associating a given distributed client end-user with a specific mainframe user identity, or it may be a more administratively friendly and functional program product, such as the IBM Enterprise Identity Mapping (EIM) product.

Actively Protecting a Data Source using an Active Avatar to Monitor, Search, Audit and Report With the above serving as background, the subject matter of this disclosure is now described. The techniques herein preferably are implemented in a security server operating within a multi-component computing environment such as described above. In a representative embodiment, the security server is z/OS Security Server having support for Resource Access Control Facility (RACF) or its equivalent. The techniques described are not limited for use with such particular products.

According to this disclosure, and as described above, an owner of a data source in a computing system protects that data source via a "virtual" entity or object, sometimes referred to herein as an "avatar." As used herein, a "data source" or "resource" that is desired to be protected should be broadly construed to refer to one of: a data object, a data set or collection, a file, a set of files within a directory, contents of a directory, multiple directories, contents of a drive, one or more identified objects, a drive, a data store, a process or program, a machine, or a set of machines.

The virtual entity has a presence in the system that is human-like. It is assigned a specific task in the system, namely, to protect the data source on behalf of the owner of that data source. To this end, the avatar is associated with (or defined by) a non-human user identifier (a "userid," or other such tag). The security server affords that userid the same accesses and privileges (permissions) of all (or defined) users, groups of user and other resources that have access to the data source to be protected. For convenience, this composite set of accesses and privileges is referred to herein as an "aggregate set of access rights and privileges" with respect to the data source. Thus, in effect, the userid identifies a virtual "user" that is a composite of all (or defined) users, groups or users and other resources that can otherwise access the data source. As such, with respect to the data source that the owner desires to protect, the virtual user is the owner's alter ego or, more commonly, the owner's avatar. As will be seen, the security server then enables the avatar to actively monitor and protect the data source, automatically and autonomously, as if the owner was performing those activities directly.

During an initial setup, one or more actions to be performed by the non-human userid upon an occurrence of an actionable event with respect to the data source are specified, and a "baseline" associated with the data source is determined. The baseline comprises data identifying permissible accesses with respect to the data source, and a list of all (or defined) users, user groups and other resources that are permitted to access the data source. After the setup is complete, a runtime operation commences. In particular, a monitor process is executed under the non-human userid, and this process records one or more accesses to the data source. Periodically, or upon a given occurrence, the monitor process spawns one or more ancillary processes to determine whether an actionable event has been triggered. These ancillary processes comprise one or more of the following: a search process (e.g., to determine whether a copy of the data source exists elsewhere in the system), an audit process (e.g., to determine whether an action or set of actions indicate a threat to the data source), and an action task process (e.g., to respond to a particular message directed to the data source). If the avatar's monitoring efforts indicate an actionable event (such as an access violation), an action as defined in an action matrix is taken. The action typically includes reporting to the data source owner and, optionally, a security administrator. The system may also respond to an actionable event to inhibit access to the resource being protected.

Thus, according to the techniques herein, a non-human userid (a data source avatar) is created, preferably to have all the accesses and privileges of any userid or groups of userids that have access to the data source to be protected. The avatar then monitors any access to the data source e.g., to collate data access for subsequent auditing, to actively search for copies (part or full), or the like. In the event of a questionable access occurring, the avatar can initiate access removal. This operation preferably is independent of the security administrator, and preferably any action is reported to the data source owner directly. This functionality thus provides a method whereby an owner of a data source on a computer or computer system can have that data source actively protected without reference to a security administrator.

The above description summarizes the basic functionality of the data source avatar (DSA) of this disclosure. The following provides additional details of a preferred implementation. In an embodiment, the functions are implemented in the security server (or, more generally, an "apparatus") as one or more computer programs, comprising a set of computer program instructions executed by one or more processors. The security server may comprise one or more processes or programs, either co-located or distributed from one another in whole or in part. In the alternative, one or more of these functions may be carried out in other computing contexts including, without limitation, a cloud computing environment.

Figure 4:
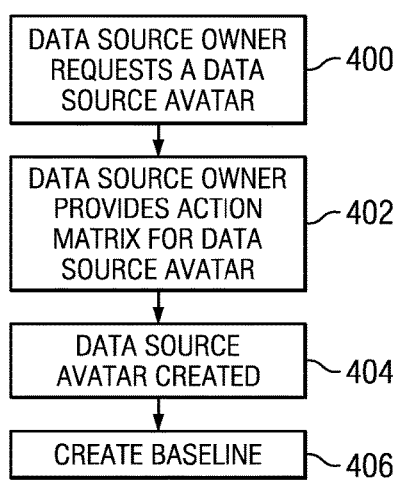
FIG. 4 is a process flow diagram illustrating an initial setup of a data source avatar (DSA) according to this disclosure.

FIG. 4 is a process flow illustrating an initial setup operation. In one embodiment, this process is performed by the data owner through one or more display panels or screens exposed by the security server. Configuration may be carried out locally or remotely to the security server. Alternatively, the initial setup (or steps thereof) may be configured programmatically. The process begins at step 400 with the data source owner requesting a data source avatar (DSA). Preferably, a given data source to be protected has its own associated DSA, although a particular DSA may be shared by or among multiple data sources. In association with the step, the owner of the data source makes a request (e.g., to the security administrator on the system where the data source resides) to create a non-human userid. In the alternative, the system may provide the non-human userid automatically or programmatically, in which case the security administrator is not involved. As described above, the DSA is then granted the same accesses and permissions of all the userids (users), groups of userids (groups of users) and other resources (such as programs) that currently can have permission to act upon (e.g., read or amend) this data source. As used herein, "all" refers to each and every one of the userids, groups, etc., or a defined or configurable subset thereof. At step 402, the owner of the data source specifies one or more and, preferably, a matrix of, actions to be performed by the DSA should an actionable event (AE) be encountered. Preferably, there is an action matrix associated with each DSA/data source. An action matrix may be shared. Such actions as defined in the matrix could be active or passive, or some combination thereof. Thus, a passive action might be reporting the occurrence to the data source owner, to the security administrator, to some other entity, or some combination thereof. An example of an active action is inhibiting action to the data source with respect to a suspect userid, or group of userids, or the like. At step 404, a DSA is created on the computer system where the data source resides. This step is carried out by instantiating an avatar process instance in the security server framework. The routine then continues at step 406 to create a snapshot with respect to the data source of all permissible accesses and list of users, groups of users and other resources (such as programs). This data is then stored as a "baseline." The baseline may be updated periodically or programmatically. This completes the initial setup for the DSA with respect to the data source that is desired to be protected by the owner.

Figure 5:
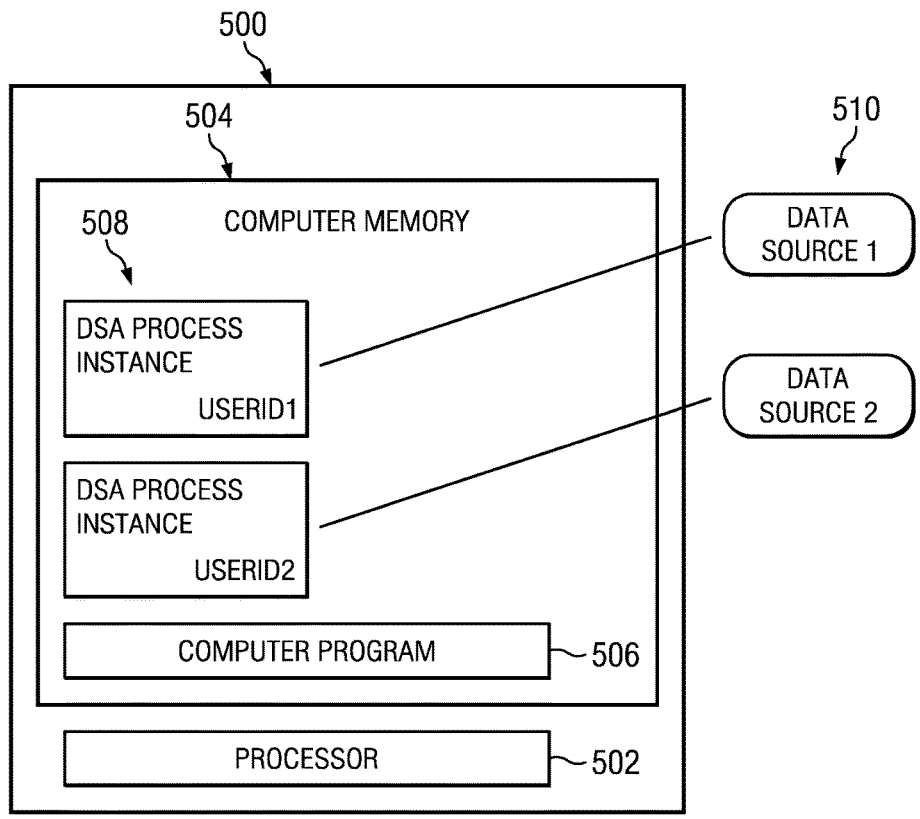
FIG. 5 illustrates a security server in which the DSA functionality may be implemented according to this disclosure.

FIG. 5 illustrates a security server 500 comprising a processor 502, and computer memory 504 holding computer program instructions 506 for creating and managing DSA process instances 508 (each a DSA) for use in actively monitoring the data sources 510. As noted, preferably the security server activates each DSA instance during a runtime operation, which is now described. Generally, the DSA instance performs monitoring with respect to the data source, and this monitoring is now described with respect to the process flow diagrams in FIG. 6 and FIG. 7. The process flow diagram in FIG. 8 illustrates how the monitor process can be used to respond to a request from the data source owner.

Figure 6:
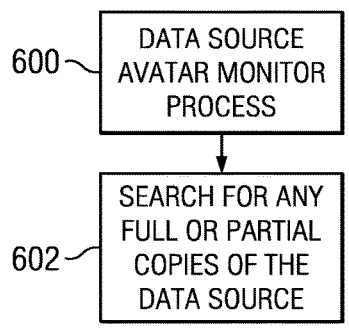
FIG. 6 is a process flow diagram illustrating a monitor process and how it is used to spawn a search according to this disclosure.

FIG. 6 illustrates how monitoring by the DSA spawns a search process. As described above, preferably a monitor process is run under the DSA userid. This is step 600. The monitor process is tasked to record all (or defined) accesses to the data source, and to maintain a cumulative summary of these accesses. Typically, this monitoring is a passive recording task. On a periodic basis, or upon a configurable event, the DSA spawns a process to search for copies of this data source. This is step 602. In particular, and using the DSA's permission scope, the search process (which may be considered a sub-process of the monitoring process, which itself is a sub-process of the DSA process instance) searches other data sources (where permitted) to determine, for example, if there are any full or partial copies of the data source being protected in such other locations. The existence of such full or partial copies may indicate a potential threat to the data source, as it may be caused by some unauthorized copying. If, as a result of the search, any such copies are located, the monitor process refers to the action matrix (AM), and then carries out (or causes some other associated process to carry out) any actions that are enabled for (relevant to) this occurrence. As defined in the action matrix, and as noted above, the system can passively report finding a partial or full copy, carry out an active response (by restricting access to that user or group of users), or the like.

There may be other "searches" performed by the search process (other than looking for full or partial copies), and thus the "search" function described above should not be taken to limit this disclosure. Thus, for example, the "search" process may be configurable, and it may be based on one or more attributes or parameters, such as time of day, location, access type, content type, content metadata, or the like.

Figure 7:
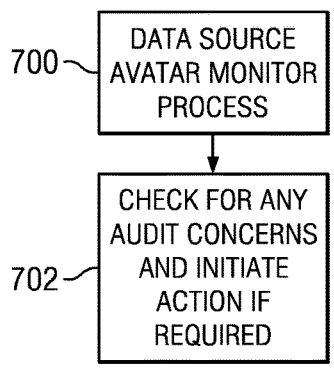
FIG. 7 is a process flow diagram illustrating how the monitor process is used to spawn an audit process according to this disclosure.
Figure 8:
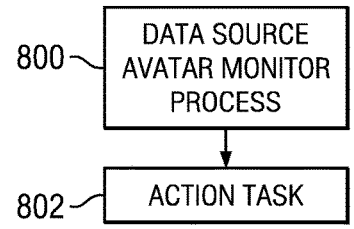
FIG. 8 is a process flow diagram illustrating how the monitor process spawns an action task to respond to a request from a data source owner according to this disclosure.

FIG. 7 illustrates how the monitor process may spawn an audit check process or sub-process. In step 700, a monitor process is run under the DSA userid as has been described. The monitor process is tasked to record all (or certain defined) accesses to the data source and to maintain a cumulative summary of these accesses. Typically, this is a passive recording task. On a periodic basis, or upon a given occurrence, at step 702, the monitor process spawns a process to analyse a result of an audit function. The types of audit functions may be quite varied, and the actual audit operations may be carried out by other systems or processes. Generally, an audit identifies an action, or a combination of actions, that the system has determined might signal a real or potential threat to the data source. Step 702 performs an analysis of the audit (or some audit result), and then it initiates an action if required. As noted above, typically the action is defined in the action matrix, and it may be active, passive, or some combination thereof.

One audit example provides data about a user who otherwise has valid access to the data source but tries to use a program that is not permitted (e.g. an FTP client). Another example is where a permitted user's access is upgraded from READ to UPDATE and back down to READ again in a short space of time. Yet another is a reporting feature that compares the current state of certain users, groups of users and other resources with the original baseline snapshot to show any changes. This scenario provides the data source owner with information regarding what changes have occurred (in access) since protection of the data source was initiated. These examples are merely representative scenarios, as step 702 may be applied to perform an audit analysis under varying configurable or programmatic conditions. As noted, preferably the data source owner is notified. If a change (as identified by the audit analysis) is not one that is sanctioned by the owner, the owner (or the system, programmatically) may respond appropriately, for example, by requesting the monitoring process to remove access, to advise the security administrator, or the like.

According to another aspect, the DSA process instance may correlate multiple events together to form a compound event, which compound event is then evaluated against the baseline to determine whether an actionable event has occurred.

The search process (of FIG. 6) and the audit process (of FIG. 7) may be initiated as "action tasks" in response to a request issued by the data source owner, by a program or system, or otherwise. Thus, as shown in FIG. 8, the monitoring process 800 may spawn an action task at step 802 under one or more conditions or occurrences. For example, an action task at step 802 may be initiated by the monitoring process in response to a request to initiate a search for any copies (full or partial) of the data comprising the data source, such as described in FIG. 6. An action task at step 802 may be initiated by the monitoring process in response to a request to initiate an audit check, such as described in FIG. 7. As another alternative, an action task may be initiated in response to a request by the data source owner to remove access (to the data source) by a user, a group of users, or other resources (such as programs). Yet another alternative is an update to the action matrix (AM). Of course, these examples are merely illustrative, and an action task initiated by the monitor process may be of varying nature. As a specific example, the monitor process 800 is run under the DSA userid, as it is configured (provisioned) to monitor for any incoming messages of a certain type (e.g., SMTP, SOAP, or the like), or for messages having a certain characteristic, and so forth. As such, the monitor process can then react to a message dispatched to it from the data source owner for an action. Upon receipt of such a message, the action task (AT) 802 is spawned. This completes the process.

The processes shown in FIG. 6, FIG. 7 and FIG. 8 may be performed concurrently, sequentially, or otherwise. They may be a single integrated process or sub-process.

As noted above, although the disclosed technique has been described in the context of z/OS Security Server with RACF, this is not a limitation.

A representative action matrix 900 is shown in FIG. 9. It comprises an array of data in a row and columnar format. Each row 902 defines a particular case number. A first column 904 defines a case number. A second column 906 defines an actionable event (or "occurrence") that may be identified by a monitor process, as has been described. The third column 908 defines an action to be taken upon occurrence of the actionable event. The fourth column 910 indicates whether or not the occurrence is to be reported to the data source owner, and the fifth column 912 indicates whether or not the occurrence should be reported to the owner and the security administrator. These are merely representative data types, formats, and layouts. Additional data types and fields may be incorporated into the action matrix. Preferably, and as noted above, there is an action matrix 900 for each DSA/data source pair.

The subject matter described herein has many advantages. By establishing a "virtual" user, the data source owner need not rely upon any central security administrator (or centralized policy) to protect a data source. The avatar acts as the owner's agent for the purpose of protecting the data source uniquely. A particular security policy can be defined and enforced on a per-data source basis, autonomously and automatically as the owner desires. In addition, the system enables the data source owner to define and enforce his or her own unique set of actions, as set forth in the action matrix.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security server components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the avatar framework described above.

The security functionality provided by the security server may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, Chrome or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

Having described my invention, what I now claim is as follows:

1. A method for protecting a data source in a physical computing environment, the data source associated with an owner, comprising:
   associating an avatar with the data source, the avatar having an aggregate set of access rights and privileges in the physical computing environment created by combining into a composite set actual access rights and privileges that a set of entities possess with respect to the data source in the physical computing environment, the avatar being an actual human-like presence in the physical computing environment with actual access rights and privileges with respect to the data source and defined by a non-human user identifier;
   associating one or more actions to be performed by the avatar upon occurrence of an actionable event with respect to the data source;
   on behalf of the owner, and in the physical computing environment, using the avatar to monitor the data source in the physical computing environment against a set of permissible events associated with the data source, wherein monitoring of the data source is enabled by the avatar's actual presence in the physical computing environment; and upon determination of an actionable event, the avatar initiating an action with respect to the data source in the physical computing environment.

2. The method as described in claim 1 wherein the set of entities comprise one of: permitted users, permitted groups of users, permitted other resources, and combinations thereof.

3. The method as described in claim 1 wherein the action initiated by the avatar is one of: issuing a notification to the owner of the data source, issuing a notification to an administrator, and combinations thereof.

4. The method as described in claim 1 wherein the one or more actions are specified in an action matrix, wherein an action matrix is specified for the avatar associated with the data source.

5. The method as described in claim 1 wherein the avatar operates autonomously with respect to a centralized security function.

6. The method as described in claim 1 further including the avatar restricting access to the data source when the actionable event indicates that the data source is at risk.

7. The method as described in claim 1 wherein the actionable event is a compound event formed by correlating multiple actionable events.

8. The method as described in claim 1 wherein using the avatar to monitor the data source includes the avatar spawning a process to search for a partial or full copy of the data source being protected in another location in the physical computing environment, wherein locating such a copy constitutes the actionable event.

9. Apparatus, comprising:
a processor;
computer memory holding computer program instructions that when executed by the processor perform a set of operations to protect a data source in a physical computing environment, the data source associated with an owner, the operations comprising:
associating an avatar with the data source, the avatar having an aggregate set of access rights and privileges in the physical computing environment created by combining into a composite set actual access rights and privileges that a set of entities possess with respect to the data source in the physical computing environment, the avatar being an actual human-like presence in the physical computing environment with actual access rights and privileges with respect to the data source and defined by a non-human user identifier;
associating one or more actions to be performed by the avatar upon occurrence of an actionable event with respect to the data source;
on behalf of the owner, and in the physical computing environment, using the avatar to monitor the data source in the physical computing environment against a set of permissible events associated with the data source, wherein monitoring of the data source is enabled by the avatar's actual presence in the physical computing environment; and
upon determination of an actionable event, the avatar initiating an action with respect to the data source in the physical computing environment.

10. The apparatus as described in claim 9 wherein the set of entities comprise one of: permitted users, permitted groups of users, permitted other resources, and combinations thereof.

11. The apparatus as described in claim 9 wherein the action initiated by the avatar is one of: issuing a notification to the owner of the data source, issuing a notification to an administrator, and combinations thereof.

12. The apparatus as described in claim 9 wherein the one or more actions are specified in an action matrix, wherein an action matrix is specified for the avatar associated with the data source.

13. The apparatus as described in claim 9 wherein the avatar operates autonomously with respect to a centralized security function.

14. The apparatus as described in claim 9 wherein the operations further include the avatar restricting access to the data source when the actionable event indicates that the data source is at risk.

15. The apparatus as described in claim 9 wherein using the avatar to monitor the data source includes the avatar spawning a process to search for a partial or full copy of the data source being protected in another location in the physical computing environment, wherein locating such a copy constitutes the actionable event.

16. A computer program product in a non-transitory computer readable medium for use in a data processing system, the computer program product holding computer program instructions which, when executed by the data processing system, perform a set of operations to protect a data source in a physical computing environment, the operations comprising:
associating an avatar with the data source, the avatar having an aggregate set of access rights and privileges in the physical computing environment created by combining into a composite set actual access rights and privileges that a set of entities possess with respect to the data source in the physical computing environment, the avatar being an actual human-like presence in the physical computing environment with actual access rights and privileges with respect to the data source and defined by a non-human user identifier;
associating one or more actions to be performed by the avatar upon occurrence of an actionable event with respect to the data source;
on behalf of the owner, and in the physical computing environment, using the avatar to monitor the data source in the physical computing environment against a set of permissible events associated with the data source, wherein monitoring of the data source is enabled by the avatar's actual presence in the physical computing environment; and
upon determination of an actionable event, the avatar initiating an action with respect to the data source in the physical computing environment.

17. The computer program product as described in claim 16 wherein the set of entities comprise one of: permitted users, permitted groups of users, permitted other resources, and combinations thereof.

18. The computer program product as described in claim 16 wherein the action initiated by the avatar is one of: issuing a notification to the owner of the data source, issuing a notification to an administrator, and combinations thereof.

19. The computer program product as described in claim 16 wherein the one or more actions are specified in an action matrix, wherein an action matrix is specified for the avatar associated with the data source.

20. The computer program product as described in claim 16 wherein the avatar operates autonomously with respect to a centralized security function.

21. The computer program product as described in claim 16 wherein the operations further include the avatar restricting access to the data source when the actionable event indicates that the data source is at risk.

22. The computer program product as described in claim 16 wherein using the avatar to monitor the data source includes the avatar spawning a process to search for a partial or full copy of the data source being protected in another location in the physical computing environment, wherein locating such a copy constitutes the actionable event.

23. A security server operative in a multi-component physical computing system that includes a mainframe operating system, comprising:

a processor;

computer memory holding computer program instructions executed by the processor to protect a data source in the physical computing system according to the following operations:

receiving a request to create a non-human userid associated with the data source, the non-human userid having an aggregate set of access rights and privileges in the physical computing system created by combining into a composite set actual access rights and privileges that a set of entities possess with respect to the data source in the physical computing system, the non-human userid being an actual human-like presence in the physical computing system with actual access rights and privileges with respect to the data source;

associating one or more actions to be performed by the avatar upon occurrence of an actionable event with respect to the data source;

generating a baseline of permissible events associated with the data source;

on behalf of an owner of the data source, and in the physical computing system, using an avatar to monitor the data source in the physical computing system against the baseline, wherein monitoring of the data source is enabled by the non-human userid's actual presence in the physical computing environment; and upon determination of an actionable event, the avatar initiating an action with respect to the data source in the physical computing system.

* * * * *